United States Patent [19]

Hatakeyama et al.

[11] Patent Number: 5,714,533
[45] Date of Patent: Feb. 3, 1998

[54] RUBBER COMPOSITION IMPROVED IN CHARGING PROPERTY AND PNEUMATIC TIRE PRODUCED BY MAKING USE OF THE SAME

[75] Inventors: Kazuya Hatakeyama; Masahiro Hojo; Daisuke Nohara, all of Tokyo, Japan; Franco Cataldo, Rome, Italy

[73] Assignee: Bridgestone Corporation, Tokyo, Japan

[21] Appl. No.: 666,366
[22] PCT Filed: Sep. 13, 1995
[86] PCT No.: PCT/JP95/01822
  § 371 Date: Jun. 6, 1996
  § 102(e) Date: Jun. 6, 1996
[87] PCT Pub. No.: WO95/31888
  PCT Pub. Date: Nov. 30, 1995

[30] Foreign Application Priority Data

Oct. 11, 1994 [IT] Italy .................. T094 A 000812
Dec. 28, 1994 [JP] Japan .................. 6-327242
Dec. 28, 1994 [JP] Japan .................. 6-327243
Jan. 23, 1995 [JP] Japan .................. 7-008310

[51] Int. Cl.⁶ .................................................. C08K 5/52
[52] U.S. Cl. ..................... 524/140; 524/141; 524/247; 524/249
[58] Field of Search ........................... 524/140, 141, 524/247, 249

[56] References Cited

FOREIGN PATENT DOCUMENTS

| | | |
|---|---|---|
| 1139315 | 6/1957 | France . |
| 487403 | 1/1973 | Japan . |
| 51-56847 | 5/1976 | Japan . |
| 53-147302 | 12/1978 | Japan . |
| 6090235 | 5/1985 | Japan . |
| 61-152747 | 7/1986 | Japan . |
| 61-152750 | 7/1986 | Japan . |
| 6248741 | 3/1987 | Japan . |
| 2202936 | 8/1990 | Japan . |
| A019670 | 2/1966 | United Kingdom . |
| 8602088 | 4/1986 | WIPO . |

OTHER PUBLICATIONS

"Surfactants" pp. 379 to 383, written by F. Kitahara et al., published by Kodansha on Apr. 20, 1979*.
"Developments of New Additives for Plastic and Rubber" pp. 167 to 176, published by K.K. C.M.C. on Feb. 25, 1983*.
"Practical Handbook for Plastic and Rubber Additives" pp. 333 to 457, published by Kagaku Kogyo sha on Jul. 20, 1989*.
*An English abstract as a concise explanation of the relevance of each thereof.
Database WPI Section Ch, Week 9335, Derwent Publications Ltd., An 93-278388 corresponding to JP-A-05 194 790.

Primary Examiner—Edward J. Cain
Attorney, Agent, or Firm—Sughrue, Mion, Zinn, Macpeak & Seas, PLLC

[57] ABSTRACT

Disclosed are a rubber composition having an improved charging property which comprises 100 parts by weight of rubber component containing diene rubber of 90 parts by weight or more, and a filler of 30 to 120 parts by weight and a nonionic surfactant or phosphoric ester of 0.2 to 8 parts by weight, and a pneumatic tire characterized by that the above rubber composition having an improved charging property is used for the tread parts of the pneumatic tire.

The typical examples of the nonionic surfactant and phosphoric ester are an adduct of ethylene oxide of 2 to 30 moles to linear, cyclic or branched, and saturated or unsaturated, and monohydric or polyhydric aliphatic alcohol having carbon atoms of 6 to 25, or an adduct of ethylene oxide of 2 to 30 moles to alkylphenol, and the compounds represented by the following formula (V):

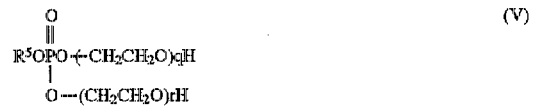

wherein $R^5$ represents a linear or branched, and saturated or unsaturated aliphatic hydrocarbon group having carbon atoms of 8 to 25, or an aryl group, and q and r each are an integer satisfying a relation of q+r=1 to 30.

22 Claims, No Drawings

RUBBER COMPOSITION IMPROVED IN CHARGING PROPERTY AND PNEUMATIC TIRE PRODUCED BY MAKING USE OF THE SAME

TECHNICAL FIELD

The present invention relates to a rubber composition improved in a charging property, and a pneumatic tire produced by making use of the same.

BACKGROUND ART

In recent years, it has become important to investigate a reduction in a rolling resistance (RR) of a tire in order to save a fuel consumption of automobiles based on social requirements to energy saving and resource saving.

It is generally known that a decrease in a rolling resistance of a tire leads to a reduction in a fuel consumption, which turns a tire into a so-called low fuel consumption tire. In general, materials having a low hysteresis loss are used as tread rubber in order to reduce a rolling resistance of a tire. On the other hand, a requirement to running stability has resulted in strongly demanding rubber materials having a large frictional resistance on a wet road (wet skid resistance).

However, a relation of antinomy exists between these low rolling resistance and wet skid resistance, and therefore it has been very difficult to satisfy both characteristics at the same time.

With respect to the requirement described above, it is known that a rubber composition for a tire into which a white filler, particularly silica or aluminum hydroxide is blended causes a wet skid performance to be highly compatible with an RR.

However, because of a non-conductivity of white fillers used for rubber, pneumatic tires using the white fillers have much higher electric resistance as compared with tires comprising rubber compositions containing mainly carbon black as the filler.

As tires roll on a road, electrostatic charge is produced by friction between a road surface and tire treads. This charge readily disappears by conduction in the case of tires which are produced from rubber compositions having a higher proportion of carbon black and have a relatively low electric resistance on the tread surface. On the other hand, in the case of tires which are produced from rubber compositions having a higher proportion of white fillers and therefore have a high electric resistance on the tread surface, a pretty large amount of charge is accumulated on the tread surface thereof. Involved therein is a problem that not only an unpleasant feeling is brought about to passengers of an automobile equipped with such tires, for example, in getting off the automobile, but also electrostatic charge accumulated during driving causes producing an electromagnetic field on the tires and emitting radio waves capable of interfering with electronic equipments loaded in the car as tires roll, which indispose or disturb radio wave reception.

On the other hand, also known as a pneumatic tire improved in a charging property are tires obtained by applying conductive materials such as copper and aluminum alloys on the surface of pneumatic tires (Japanese Patent Application Laid-Open No. Sho 48-7403). However, also involved is a problem that since the tires always rub a road surface and are abraded therewith, the coating peels off soon, and therefore the antistatic effect is lost in an early stage.

Further, also known as a pneumatic tire using a rubber composition improved in a charging property are radial tires for passenger cars, in which at least surface parts of side treads are composed of rubber compositions blended with conductive carbon black (Japanese Patent Application Laid-Open No. Sho 60-90235 and Japanese Patent Application Laid-Open No. Hei 2-202936). However, also involved is a problem that while this technique provides a large effect of improving the conductivity, it markedly deteriorates the RR and therefore cancels an effect of using a white filler.

Further, known are antistatic tires in which metal wires are put into lines connecting beads with treads, and the ends of the respective metal wires are exposed (Japanese Patent Application Laid-Open No. Sho 53-147302). However, a problem exists in that producing electrostatic charge on treads themselves can not be prevented.

Further, also known is a conductive chloroprene rubber composition for a sheath material using Ketjen Black EC, conductive carbon black with chloroprene rubber (Japanese Patent Application Laid-Open No. Sho 60-90235). However, this rubber composition is used for a specific use such as a sheath material and can not be applied to tire treads which always rub a road surface and are abraded therewith.

Also known is a rubber composition characterized by that dihydric alcohol having an average molecular weight of 50 to 6000 is added in a proportion of 5 to 40 weight (Japanese Patent Application Laid-Open No. Sho 62-48741). However, involved is a problem that since dihydric alcohol is less effective and therefore has to be added in large quantities, the cost increases, and a demerit of deteriorating the RR is involved.

On the other hand, with respect to antistatic techniques, various antistatic agents for plastics making use of surfactants are known ("Surfactants" pp. 379 to 383, written by F. Kitahara et al, published by Kodansha on Apr. 20, 1979). An antistatic effect for plastics is displayed by causing an antistatic agent to bloom on the surface of plastics to form a hydrophilic (conductive) film.

However, since tire treads always rub a road surface and are abraded therewith, and therefore the film can not be expected to grow, these antistatic agents can not be applied to tire rubber. Further, various compounding agents for rubber such as carbon black and vulcanizing agents are added to rubber compositions for tire treads, and therefore the antistatic agents should not be exerted any adverse effects or should not be lost their antistatic effect by interaction with these agents. Further, the antistatic agents for plastics do not have to exert an influence either on the basic physical properties of the rubber compositions or workability and processability, and therefore the antistatic agents for plastics can not readily be used for rubber compositions without difficulty even if they are effective for plastics.

Accordingly, in the conventional techniques described above, the present state is that in rubber compositions using white fillers such as silica and aluminum hydroxide, rubber compositions improved in the charging property and pneumatic tires making use of the same have not yet been available.

An object of the present invention is to provide a rubber composition using a white filler and having an improved charging property. The rubber composition is not exerted any influence on the basic physical properties and holds an antistatic property without having disadvantages by interaction among compounding agents.

Another object of the present invention is to provide a pneumatic tire in which the charging property is improved and, at the same time, the wet skid performance is highly compatible with RR when the rubber composition is applied to pneumatic tires.

DISCLOSURE OF INVENTION

Intensive investigations made by the present inventors in order to solve the conventional problems described above have resulted in finding that the problems described above can be solved by blending rubber containing diene rubber with a filler and a specific additive which can improve the charging property of a rubber composition in a specific amount and thereby a rubber composition having an improved charging property, which is the object described above, and a pneumatic tire produced by making use of the same, can be successfully obtained, and thus coming to complete the present invention.

That is, the first rubber composition of the present invention having an improved charging property is characterized by that rubber of 100 parts by weight containing diene rubber of 90 parts by weight or more is blended with a filler of 30 to 120 parts by weight and a nonionic surfactant or phosphoric ester of 0.2 to 8 parts by weight.

A white filler accounts preferably for 40 weight % or more of the filler described above.

The white filler described above is preferably silica or aluminum hydroxide.

The nonionic surfactant described above is preferably an adduct of ethylene oxide of 2 to 30 moles to linear, cyclic or branched, and saturated or unsaturated, and monohydric or polyhydric aliphatic alcohol having carbon atoms of 6 to 25, an adduct of ethylene oxide of 2 to 30 moles to alkylphenol, or a compound represented by the following formula (I), (II) or (III):

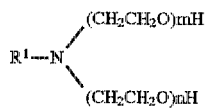  (I)

wherein $R^1$ represents a linear or branched, and saturated or unsaturated aliphatic hydrocarbon group having carbon atoms of 8 to 25, and m+n is an integer of 1 to 30 in terms of a central value;

  (II)

wherein $R^2$ represents a linear or branched, and saturated or unsaturated aliphatic hydrocarbon group having carbon atoms of 8 to 25, a vinyl group, an isopropenyl group, or an aryl group, and x is an integer of 2 to 30 in terms of a central value;

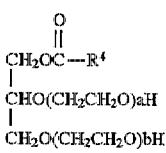  (IV)

wherein $R^4$ represents a linear or branched, and saturated or unsaturated aliphatic hydrocarbon group having carbon atoms of 8 to 25, and a+b is an integer of 0 to 30 in terms of a central value.

The phosphoric ester is represented preferably by the following formula (V) or (VI):

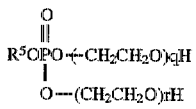  (V)

wherein $R^5$ represents a linear or branched, and saturated or unsaturated aliphatic hydrocarbon group having carbon atoms of 8 to 25, or an aryl group, and q and r each are an integer satisfying a relation of q+r=1 to 30; or

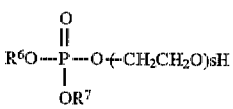  (VI)

wherein $R^6$ and $R^7$ each represent a linear or branched, and saturated or unsaturated aliphatic hydrocarbon group having carbon atoms of 8 to 25, or an aryl group and may be the same or different, and s is an integer of 1 to 30.

The second rubber composition of the present invention having an improved charging property is characterized by that it comprises rubber comprising at least diene polymer or copolymer, a filler comprising a white filler or a mixture of carbon black and a white filler, and an antistatic agent comprising at least a nonionic surfactant represented by the following formula (VII):

  (VII)

wherein $R^8$ represents a hydrophilic group, and $R^9$ represents a substituted or non-substituted aryl group.

In particular, $R^8$ is preferably a group represented by a formula:

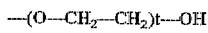

wherein t is an integer and preferably 5 to 10, and $R^9$ is preferably an alkyaryl group represented by a formula:

wherein $R^{10}$ is an aliphatic group and in particular, preferably represented by

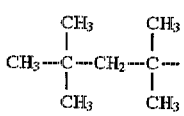

In the formula (VII), the aryl group represents a group derived by removing a hydrogen atom from an aromatic hydrocarbon group, wherein one or more hydrogen atoms may be substituted with another elements such as nitrogen and halogen, or functional groups such as an alcoholic group —OH, an acid group —COOH, and a ketone group =C=O.

Further, the pneumatic tire of the present invention is characterized by that the preceding rubber composition having an improved charging property is used for the tread part of the pneumatic tire.

The rubber composition of the present invention having an improved charging property is constituted by combining the filler and the nonionic surfactant or phosphoric ester with rubber containing diene rubber. The rubber composition having an improved charging property, which is not exerted any influence on the basic physical properties and holds the antistatic effect without having desadvantages by interaction among compounding agents for rubber, can be obtained only by causing a blending amount of the filler described above and a specific amount of the nonionic surfactant or phosphoric ester to become synergistic to each other. Further, when the rubber composition of the present invention is applied to the tread part of a pneumatic tire, the pneumatic tire in which the charging property is improved and the wet skid performance is highly compatible with the RR can be obtained, but the object of the present invention shall not be achieved by satisfying partially the conditions described above.

BEST MODE FOR CARRYING OUT THE INVENTION

The present invention shall be explained below in detail.

The diene rubber used for the first rubber composition of the present invention is selected from natural rubber (NR) and synthetic diene rubbers. There can be used as the diene rubber, for example, styrene-butadiene rubber (SBR), polybutadiene rubber (BR), polyisoprene rubber (IR), and a mixture thereof.

In the present invention, the diene rubber is contained in an amount of 90 parts by weight or more out of 100 parts by weight of the rubber component. This is because the diene rubber is needed for vulcanization and according to necessity, for a purpose of improving the physical properties at a low temperature blending a small amount of non-diene rubber such as halogenated butyl rubber (CL-IIR) exerts no influences on the effects of the present invention. Accordingly, non-diene rubber such as halogenated butyl rubber (CL-IIR) and ethylene-propylene rubber (EPM, EPDM) can be blended as well in a range of the blending amount described above. The diene rubber may account for 100 parts by weight.

Any ones can be used as the filler in the present invention without having any restrictions as long as they can be used as fillers for rubber, and the filler includes, for example, carbon black and a white filler.

The white filler includes, for example, silica, aluminum hydroxide (hygilite™: available from SHOWA DENKO K.K.), alumina, magnesium hydroxide, magnesium oxide, titan white, talc, attapulgite, clay, kaolin, pyrophyllite, and bentonite. These white fillers may be used alone or in combination of two or more kinds thereof.

The particularly preferred white fillers are silica and aluminum hydroxide (hygilite). These two fillers can further markedly enhance the wet skid performance without reducing the other characteristics.

Further, carbon black or the white filler may be used alone, or the white filler may be used in combination with carbon black.

The blending amount of the filler is 30 to 120 parts by weight per 100 parts by weight of the rubber component described above. The preferred blending amount of the filler is varied depending on the intended applications of the rubber composition, for example, depending on the applications of tires if used for the tires. The blending amount is suitably controlled in the range described above.

The blending amount of the filler of less than 30 parts by weight is not preferred since abrasion resistance is inferior, and the blending amount exceeding 120 parts by weight is not preferred as well since the RR increases.

The content of the white filler out of the fillers accounts preferably for 40 weight % or more and is determined depending on the performance of an intended tire. The content of the white filler of less than 40 weight % is not preferred since the wet skid performance and the RR are deteriorated.

The nonionic surfactant or phosphoric ester used in the present invention is blended in order to improve the charging property. Surfactants include an anionic series and a cationic series as well as a nonionic series. However, as shall be shown in the examples and comparative examples described later, only nonionic surfactants are particularly suitable for preventing electrification and electrostatic electricity. They do not influence the basic physical properties of the rubber composition and do not exert any adverse effect or do not cause the antistatic effect to be lost by interaction with other compounding agents for rubber.

The nonionic surfactant and phosphoric ester used in the present invention are not substances which bleed to exert an antistatic effect as is the case with conventional surfactants. If they bleed, only the surface resistance decreases, and the volume resistivity does not vary. In the present invention, however, the volume resistivity itself decreases. That is, the present invention is different from antistatic techniques based on conventional surfactants. This is obvious from the fact that the antistatic effect is exhibited even immediately after wiping the surface off with a solvent. Accordingly, the rubber composition of the present invention is effective as well for tire treads which are rubbed and abraded.

The nonionic surfactant used in the present invention includes an adduct of ethylene oxide of 2 to 30 moles to linear, cyclic or branched, and saturated or unsaturated, and monohydric or polyhydric aliphatic alcohol having carbon atoms of 6 to 25, or an adduct of ethylene oxide of 2 to 30 moles to alkylphenol. They may be used alone or in combination of two or more kinds thereof.

Alcohols having carbon atoms of less than 6 are not preferred since they provide the inferior affinity to the rubber and cause bleeding on the surface. Meanwhile, alcohols having carbon atoms exceeding 25 are not preferred as well since they increase the cost of the alcohols which are the raw material and necessitate a large blending amount.

The added mole number of ethylene oxide is 2 to 30 (central value). The added mole number exceeding 31 is not preferred since it deteriorates the affinity to the rubber and causes bleeding on the surface.

In particular, the weight of ether type oxygen atoms contained in the surfactant accounts preferably for 25 to 35%. This is because no concern about bleeding is caused and the antistatic effect increases.

The typical nonionic surfactant of this type is represented by the following formula (III):

wherein $R^3$ represents a linear or branched, and saturated or unsaturated aliphatic hydrocarbon group having carbon atoms of 6 to 25, or an alkylphenol group, and y is an integer of 2 to 30 in terms of a central value.

The concrete examples of this type of the surfactant are shown in the following Table 1.

TABLE 1

Concrete examples of nonionic surfactants

| Nonionic surfactants | Carbon No. of alcohol | | | |
|---|---|---|---|---|
| Polyoxyethylene stearyl alcohol ether | $C_{18}$ | Linear | Saturated | Monohydric |
| Polyoxyethylene lauryl alcohol ether | $C_{12}$ | Linear | Saturated | Monohydric |
| Polyoxyethylene 2-ethyl-hexanol ether | $C_8$ | Branched | Saturated | Monohydric |
| Polyoxyethylene tri-decanol ether | $C_{13}$ | Linear | Saturated | Monohydric |
| Polyoxyethylene sorbitol ether | $C_6$ | Linear | Saturated | Polyhydric |
| Polyoxyethylene nonyl-phenyl ether |  | | Aromatic | |
| Polyoxyethylene cetyl alcohol ether | $C_{16}$ | Linear | Saturated | Monohydric |
| Polyoxyethylene sperm alcohol ether | $C_{16}$–$C_{20}$ | Linear | Unsaturated | Monohydric |
| Polyoxyethylene jojoba alcohol ether | $C_{16}$–$C_{24}$ | Linear | Unsaturated | Monohydric |
| Polyoxyethylene coconut alcohol ether | $C_8$–$C_{18}$ | Linear | Unsaturated | Monohydric |
| Polyoxyethylene sorbitan ether | $C_6$ | Cyclic | Saturated | Polyhydric |
| Polyoxyethylene di-octanol ether | $C_8$ | Linear | Saturated | Monohydric |
| Polyoxyethylene biscetyl alcohol ether | $C_{16}$ | Linear | Saturated | Monohydric |

In the case of ordinary polyethylene glycol, the antistatic effect is not exerted, and even in the case of an ether made of polypropylene glycol and an alcohol, the antistatic effect is small. Accordingly, it is essential to have both of a polyethylene glycol structure and a group having high affinity with a polymer. As another nonionic surfactant used in the present invention, there can be used, for example, at least one of the substances represented by the following formulas (I), (II) or (IV), that is, alone or in combination of two or more kinds thereof:

$$R^1-N\begin{matrix}(CH_2CH_2O)mH\\ \\(CH_2CH_2O)nH\end{matrix} \qquad (I)$$

wherein $R^1$ represents a linear or branched, and saturated or unsaturated aliphatic hydrocarbon group having carbon atoms of 8 to 25, and m+n is an integer of 1 to 30 in terms of a central value.

The nonionic surfactant represented by the formula (I) shown above includes, for example, N,N-bis(2-hydroxyethyl)octylamine, N,N-bis(2-hydroxyethyl)-dodecylamine, N,N-bis(dioxyethylene)dodecylamine, N,N-bis(polyoxyethylene)octadecylamine, and N-2-hydroxyethyldodecylamine.

wherein $R^2$ represents a linear or branched, and saturated or unsaturated aliphatic hydrocarbon group having carbon atoms of 8 to 25, or an aryl group, and x is an integer of 2 to 30 in terms of a central value.

The nonionic surfactant represented by the formula (II) shown above includes, for example, diethylene glycol monomethacrylate, polyethylene glycol monomethacrylate, sorbitan trioleate, and dioxyethylene monostearate. Further, included as well are esters of mixed fatty acids obtained from vegetable oils and animal oils with polyethylene glycol.

wherein $R^4$ represents a linear or branched, and saturated or unsaturated aliphatic hydrocarbon group having carbon atoms of 8 to 25, and a+b is an integer of 0 to 30 in terms of a central value.

The nonionic surfactant represented by the formula (IV) shown above includes, for example, glycerol monostearate, glycerol monooleate, glycerol monolaurate, polyoxyethylene glycerine monostearate, and polyoxyethylene monooleate. Further, esters of mixed fatty acids with glycerine are included as well.

The short (a carbon number of 7 or less) hydrocarbon chains of $R^1$ to $R^4$ in the formulas (I) to (IV) shown above are not preferred since they degrade the affinity to the rubber and cause bleeding on the surface during a processing step to deteriorate the tackiness. Further, they are not preferred since they bleed after incorporated into a finished product to deteriorate the appearance.

On the other hand, the long (a carbon number exceeding 25) hydrocarbon chains are not preferred as well since they require a large blending amount and exert adverse effects on low fuel consumption and abrasion resistance, and further, they increase the cost of raw materials and therefore are not economical.

Further, in $(CH_2CH_2O)$m, n, x, y, a, b, the larger the numbers of m, n, x, y, a, and b are, the better the antistatic effect is. However, too large numbers of m, n, x, y, a, and b are not preferred since they degrade the affinity to the rubber. The weight of ether type oxygen atoms contained in the surfactant accounts preferably for 25 to 35% since no concern about bleeding is caused and the antistatic effect is satisfactory.

$R^1$ to $R^4$ in the formulas (I) to (IV) shown above are not required to have a single structure, respectively and may be synthesized from a mixture of beef tallow and palm oil, etc. $(CH_2CH_2O)$m, n, x, y, a, b are not required to have a single structure, respectively and may be of composition having distributions, wherein m, n, x, y, a, and b represent average values, respectively.

Next, the phosphoric ester includes substances represented by the following formula (V) or (VI) and can be used alone or in combination of at least two kinds thereof:

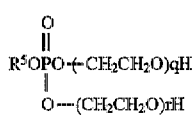   (V)

wherein $R^5$ represents a linear or branched, and saturated or unsaturated aliphatic hydrocarbon group having carbon atoms of 8 to 25, or an aryl group, and q and r each are an integer satisfying a relation of q+r=1 to 30:

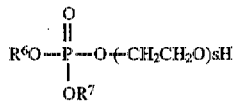   (VI)

wherein $R^6$ and $R^7$ each represent a linear or branched, and saturated or unsaturated aliphatic hydrocarbon group having carbon atoms of 8 to 25, or an aryl group and may be the same or different; and s is an integer of 1 to 30.

The carbon number of less than 8 degrades the affinity to the rubber and causes concern on bleeding. Meanwhile, the carbon number exceeding 25 requires a large blending amount. Accordingly, both are not preferred.

The larger the added mole number of ethylene oxide is, the larger the antistatic effect tends to become, but the smaller the affinity to the rubber becomes.

The weight of ether type oxygen atoms contained in the surfactant accounts preferably for 20 to 30%.

The phosphoric esters of the formulas (V) and (VI) may have a single structure or may be mixtures. They may be, for example, compounds obtained from mixed alcohols, which are used as raw materials.

The values of q+r, and s are average values and may have distributions.

The examples of $R^5$, $R^6$ and $R^7$ in the formulas (V) and (VI) include an octyl group, a 2-ethyloctyl group, a lauryl group, a stearyl group, an oleyl group, a dodecanyl group, a phenyl group, a tolyl group, and a nonylphenyl group. However, they shall not be restricted thereto.

The blending amount of the nonionic surfactant or phosphoric ester is 0.2 to 8 parts by weight, preferably 1 to 4 parts by weight per 100 parts by weight of the rubber described previously. The blending amount of the nonionic surfactant of less than 0.2 parts by weight can not provide the desired antistatic effect and electrostatic inhibition effect, and the amount exceeding 8 parts by weight produces inconveniences such as too much accelerated or retarded vulcanization and a reduction in a rubber-rubber interface adhesion. Accordingly, both are not preferred. Further, excess blend provides the effects only to a limited extent.

The preferred embodiment of the second rubber composition of the present invention is a composition comprising rubber component of 100 parts by weight comprising a copolymer of an aromatic vinyl hydrocarbon and a diene, wherein the amount of the aromatic vinyl hydrocarbon is about 30 to 70 parts by weight; the diene vinyl content is less than 20%; Mn value is 250,000 or more; and polydispersity index Mw/Mn is less than 2.5, the white filler, the nonionic surfactant represented by the formula (VII) shown previously, and a coupling agent, which comprises silane, of 1 to 15 weight % based on the weight of the white filler.

In this case, the composition may optionally contain a polymer or a copolymer selected from the group consisting of solution-polymerized styrene-butadiene rubber (SSBR), emulsion-polymerized styrene-butadiene rubber (emulsion SBR), dispersion-polymerized styrene-butadiene rubber (dispersion SBR), natural rubber (NR), butadiene rubber (BR), and polyisoprene rubber (IR).

Further, in another embodiment, the composition comprises (a) about 50 to 100 parts by weight of a diene polymer or copolymer having a carbon-metal bond in the main chain, (b) 0 to 50 parts by weight of an elastic polymer selected from the group consisting of 1,4-polyisoprene (1,4-IR), 3,4-polyisoprene (3,4-IR), polybutadiene (BR), natural rubber (NR), epoxidized natural rubber (ENR), styrene-butadiene rubber (SBR), and the mixtures thereof, (c) a filler comprising the white filler or the mixture of carbon black and the white filler, (d) a coupling agent, which comprises silane, of 0.5 to 10 weight % based on the weight of the white filler, and (e) the nonionic surfactant represented by the formula (VII).

The nonionic surfactant is preferably represented by the formula (VII) described above, preferably wherein, $R^8$ is:

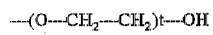

(t is an integer of 5 to 10)
$R^9$ is:

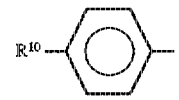

and, $R^{10}$ is:

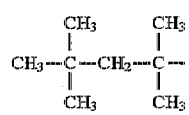

For example, an antistatic agent belonging to the group of a surfactant which is commercially available from Union Carbide Corp. and known in the market under the trade name of TRITON™ is contained in a suitable and relatively small amount, for example, 5 phr (parts by weight per 100 parts of the rubber polymer).

The white filler used preferably comprises precipitated silica having a BET surface area of 20 to 300 m²/g. However, the silica filler which meets the object includes highly dispersed silica in which the specific surface area is about 5 to 1000 m²/g (measured by using nitrogen gas and a known BET method), and the major particles fall in a particle diameter range of about 5 to 500 nm (nanometer). It may be precipitated from a silicate solution, for example, by hydrolysis and/or high temperature oxidation conversion. Flame hydrolysis of volatile silicon halides, for example, silicon tetrachloride, or an arc method may be used.

The examples of the commercial silica which meets the object of the present invention include Hisil™ 233 (PPG Industries, Inc.), Ultrasil VN3™ and Aerosil™ (Degussa AG.), and Cabosil™ (Cabot Corp. Ltd.). In general, the high quality precipitated silica is preferred from the economical point of view.

The total amount of the filler, though not definitely, falls preferably in a range of 60 to 100 parts by weight per 100 parts by weight of the whole rubber polymer contained, and the white filler accounts for 40 to 90% based on the whole fillers.

The silane coupling agent preferably used in a specific embodiment of the present invention is bis(3-triethoxysilylpropyl)tetrasulfide and is added in a proportion of about 2 to 10 parts by weight. The amount of the silane coupling agent used may be considerably varied but has to produce a coupling effect by which the finished product having desired properties is provided.

In the rubber composition of the present invention, there may suitably be blended, according to necessity, compounding agents usually used as rubber compounding agents, for example, vulcanizing agents, softening agents, vulcanization accelerators, antioxidants, and coupling agents enhancing the reinforcing property of the fillers, as well as the components described above. When the nonionic surfactant used in the present invention is liquid and inconvenient in handling, it can be adsorbed in advance by a solid such as silica to improve the handling before using.

The rubber composition of the present invention can be obtained by kneading the rubber composition comprising the rubber component containing the diene rubber described previously, the filler, the nonionic surfactant or phosphoric ester, and the rubber compounding agents blended according to necessity by means of conventional processing equipment, for example, rolls, a banbury mixer, a kneader and the like. The nonionic surfactant or phosphoric ester of the present invention may be added either to a master batch or at the final stage, and the addition thereof at the final stage is more effective for increasing the antistatic effect. In the case of the liquid substance, however, the addition thereof to the master batch makes the work easier.

The rubber composition of the present invention can be used for rubber products which is required to prevent electrostatic charge, such as pneumatic tires, conveyor belts, home electrical appliances, and audio equipment.

The pneumatic tire of the present invention is characterized by that the preceding rubber composition having an improved charging property is used for its tread part. Since the wet skid performance is highly compatible with the RR and electrostatic charge is prevented from being generated in rolling, radio noises in cars and electrical shock to human bodies caused when touching cars can be prevented.

EXAMPLES

Next, the present invention shall concretely be explained with reference to examples and comparative examples but the present invention shall by no means be restricted to these examples.

In the examples, the evaluation tests of the rubber composition were carried out in the following manners.

(1) Measurement of Volume Resistivity

The volume resistivity was measured at an applied voltage of 500 V with an insulation resistance tester and an extra-insulation resistance tester (both manufactured by Advantest Corp.). The smaller the value is, the more the conductivity increases, and the more the generation of electrostatic charge is inhibited.

The value $\Delta\Delta En$ of the volume resistivity represents $\Delta\Delta \times 10^n$, and the unit thereof is $\Omega$ cm.

(2) Wet Skid Performance

The wet skid performance was measured with a British portable wet skid tester, and the results were shown by indices. The larger the index is, the more excellent the wet skid performance is.

(3) 50° C. tan $\delta$ (Low Exothermic Property)

A visco-elasticity measuring apparatus (TOYO SEIKI SEISAKU-SHO Ltd.) was used to determine tan $\delta$ at 50° C. and a distortion of 1%, and the results were shown by indices. The larger the index is, the lower the hysteresis loss is, that is, the more excellent the RR is.

Examples 1 to 22 and Comparative Examples 1 to 8

The surfactants shown in the following Table 2 were selected, and the fillers such as silica were mixed first with the raw material rubbers (SBR, NR and CL-IIR). Then, according to the recipes (blend unit: part by weight) shown in the following Tables 3 to 8, the other compounding agents and the nonionic surfactants were mixed by using a banbury type internal mixer to prepare the rubber compositions. Then, these rubber compositions were used to carry out the evaluation tests on the volume resistivity, wet skid performance and 50° C. tan $\delta$ (low exothermic property).

The evaluation results thereof are shown in the following Tables 4, 6 and 8.

TABLE 2

| No. | Raw material alcohol | $R^3$ | Ethylene oxide average add. mole number (y) | |
|-----|----------------------|-------|---------------------------------------------|---|
| A | 2-Ethylhexyl alcohol | $C_8H_{17}-$ | 13 | Nonionic |
| B | Nonylphenol | 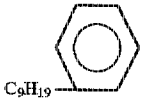 | 15 | Nonionic |
| C | Sorbitol | $C_6$ | 30 | Nonionic |
| D | Lauryl alcohol | $C_{12}H_{25}-$ | 15 | Nonionic |
| E | Cetyl alcohol | $C_{16}H_{33}-$ | 13 | Nonionic |
| F | Oleyl alcohol | $C_{18}H_{35}-$ | 15 | Nonionic |
| G | Sperm alcohol | $C_{16}H_{33}-$ 25%<br>$C_{18}H_{35}-$ 66%<br>$C_{20}H_{39}-$ 8% | 20 | Nonionic |
| H | Jojoba alcohol | $C_{20}H_{39}-$ 44%<br>$C_{22}H_{43}-$ 45%<br>$C_{24}H_{47}-$ 9% | 25 | Nonionic |
| I | Stearyl alcohol | $C_{18}H_{37}-$ | 30 | Nonionic |
| J | Octyl alcohol | $C_8H_{17}-$ | 15 | Nonionic |
| K | Octadecyltrimethyl-ammonium chloride | — | — | Cationic |
| L | Sodium dodecyl-benzenesulfonate | — | — | Anionic |

$R^3O-(CH2CH2O)_y H$

TABLE 3

| Component | Part by weight |
|---|---|
| SBR/NR | 70/30 |
| Aromatic oil | 15 |
| Stearic acid | 2 |
| Antioxidant 6C | 1 |
| Wax | 1.5 |
| Zinc oxide | 3 |
| Vulcanization accelerator (DM)*1 | 0.4 |
| Vulcanization accelerator (TBBS)*2 | 0.6 |
| Sulfur | 1.8 |
| Silica | 50 |
| Coupling agent*3 | 5 |
| Surfactant | Variable |

*1: Dibenzothiazyl disulfide
*2: N-t-butyl-2-benzothiazyl sulfenamide
*3: Si69 manufactured by Degussa AG.

TABLE 4

| | Comparative Example | | | Example | | | | |
|---|---|---|---|---|---|---|---|---|
| | 1 | 2 | 3 | 1 | 2 | 3 | 4 | 5 |
| Surfactant | — | K | L | A | A | A | B | C |
| Blending amount | — | 2 | 2 | 0.3 | 2 | 8 | 2 | 2 |
| Volume resistivity | 1.3E15 | 1.1E15 | 1.5E15 | 8.2E14 | 5.1E13 | 3.3E10 | 6.3E13 | 1.3E14 |
| Wet skid | 100 | 100 | 99 | 100 | 101 | 102 | 101 | 100 |
| 50° C. tan δ | 100 | 101 | 101 | 100 | 99 | 97 | 100 | 162 |

| | Example | | | | | | | Comparative Example |
|---|---|---|---|---|---|---|---|---|
| | 6 | 7 | 8 | 9 | 10 | 11 | 12 | 4* |
| Surfactant | D | E | F | G | H | I | J | — |
| Blending amount | 2 | 2 | 2 | 2 | 2 | 2 | 2 | — |
| Volume resistivity | 6.5E13 | 7.2E13 | 6.6E13 | 5.5E13 | 5.8E13 | 5.3E13 | 5.0E13 | 9.6E9 |
| Wet skid | 99 | 99 | 100 | 99 | 101 | 102 | 100 | 88 |
| 50° C. tan δ | 100 | 100 | 99 | 98 | 98 | 99 | 100 | 80 |

*Carbon black of 50 parts by weight was blended in place of silica.

Consideration on the Results Shown in Tables 3 and 4

It can be found from the results obtained in Examples 1 to 12 that the addition of the surfactants of the present invention produces an effect to lower the volume resistivities without influencing the wet skid performance or the low exothermic property.

It has been found from the results obtained in Examples 1 to 3 that an increase in the added amount of the surfactant decreases the volume resistivities linearly, thought it deteriorats the low exothermic properties to some extent.

On the other hand, Comparative Example 1 is the case in which the nonionic surfactant was not blended, wherein the volume resistivity is large and therefore the generation of electrostatic charge can not be suppressed.

Comparative Examples 2 and 3 are the cases where the cationic (K) and anionic (L) surfactants known as antistatic agents for plastics were blended, wherein the volume resistivities are large, and therefore these surfactants are not effective.

Comparative Example 4 is the case in which the nonionic surfactant was not blended and carbon black of 50 parts was blended, wherein the volume resistivity is small and electrostatic charge is not produced, but the wet skid performance and the low exothermic property are extremely inferior.

TABLE 5

| Component | Blending amount |
|---|---|
| SBR/NR/C1-IIR | 40/50/10 |
| Aromatic oil | 15 |
| Stearic acid | 2 |
| Antioxidant 6C | 1 |
| Wax | 1.5 |
| Zinc oxide | 3 |
| Vulcanization accelerator (DM)*1 | 1 |
| Vulcanization accelerator (DPG)*2 | 0.5 |
| Sulfur | 15 |
| Carbon black | 25 |
| Silica | 25 |
| Coupling agent*3 | 2.5 |
| Surfactant | 3 |

*1: Dibenzothiazyl disulfide
*2: Diphenylguanidine
*3: Si69 manufactured by Degussa AG.

TABLE 6

| | Comparative Example | Example | | | | | Comparative Example | |
|---|---|---|---|---|---|---|---|---|
| | 5 | 13 | 14 | 15 | 16 | 17 | 6 | 7 |
| Surfactant | — | A | B | E | H | J | K | L |
| Blending amount | — | 3 | 3 | 3 | 3 | 3 | 3 | 3 |
| Volume resistivity | 4.2E14 | 1.3E12 | 1.7E12 | 1.9E12 | 1.3E12 | 1.2E12 | 4.0E14 | 4.2E14 |
| Wet skid | 100 | 102 | 100 | 99 | 101 | 101 | 99 | 99 |
| 50° C. tan δ | 100 | 100 | 98 | 99 | 99 | 101 | 100 | 98 |

Consideration on the Results Shown in Table 6

Shown are the cases where silica was used in combination with carbon black as the fillers.

In Examples 13 to 17 in which the nonionic surfactants (A, B, E, H and J) were blended, it has been found that the wet skid performances are highly compatible with the low exothermic properties, and since the volume resistivities are small, the generation of electrostatic charge is suppressed.

In contrast with this, Comparative Example 5 is the case in which the nonionic surfactant was not blended, wherein the volume resistivity is large, and therefore the electrification of electrostatic charge can not be prevented.

In Comparative Examples 6 and 7 in which the cationic and anionic surfactants were blended, it can be found that the volume resistivities are large as well, and these surfactants are not effective for preventing the electrification of electrostatic charge.

TABLE 7

| Component | Blending amount |
|---|---|
| SBR | 100 |
| Aromatic oil | 50 |
| Stearic acid | 2 |
| Antioxidant 6C | 1 |
| Wax | 1.5 |
| Zinc oxide | 3 |
| Vulcanization accelerator (DM) | 1.2 |
| Vulcanization accelerator (DPG) | 0.6 |
| Sulfur | 1.8 |
| Carbon black | 20 |
| Aluminum hydroxide | 80 |
| Surfactant | 3 |

TABLE 8

| | Comparative Example | Example | | | | |
|---|---|---|---|---|---|---|
| | 8 | 18 | 19 | 20 | 21 | 22 |
| Surfactant | — | A | B | E | H | J |
| Blending amount | — | 3 | 3 | 3 | 3 | 3 |
| Volume resistivity | 4.7E14 | 2.9E12 | 3.6E12 | 3.4E12 | 3.1E12 | 2.8E12 |
| Wet skid | 100 | 100 | 101 | 101 | 102 | 101 |
| 50° C. tan δ | 100 | 101 | 99 | 100 | 98 | 100 |

Consideration on the Results Shown in Table 8

Shown are the cases where aluminum hydroxide was used in combination with carbon black as the fillers.

In Examples 18 to 22 in which the nonionic surfactants of the present invention were blended, it has been found that the wet skid performances are highly compatible with the low exothermic properties, and since the volume resistivities are small, the generation of electrostatic charge is suppressed.

In contrast with this, Comparative Example 8 is the case in which the nonionic surfactant was not blended, wherein the volume resistivity is large, and therefore the generation of electrostatic charge has not been able to be suppressed.

Examples 23 to 51 and Comparative Examples 9 to 17

The surfactants shown in the following Table 9 were selected, and the fillers such as carbon black and silica were mixed first with the raw material rubbers (SBR, NR and CL-IIR). Then, according to the recipes (blend unit: part by weight) shown in the following Tables 10 to 13, the other compounding agents and the nonionic surfactants were mixed by using the banbury type internal mixer to prepare the rubber compositions. Then, these rubber compositions were used to carry out the evaluation tests on the volume resistivity, wet skid performance and 50° C. tan δ (low exothermic property).

The evaluation results thereof are shown in the following Tables 11 to 13.

TABLE 9

| No. | Chemical formula/chemical name | |
|---|---|---|
| a | $C_8H_{17}-N(CH_2CH_2OH)_2$<br>N,N-bis(2-hydroxyethyl)octylamine | Nonionic |
| b | $C_{12}H_{25}-N(CH_2CH_2OH)_2$<br>N,N-bis(2-hydroyethyl)dodecylamine | Nonionic |
| c | $C_{18}H_{37}-N((CH_2CH_2O)_2-H)_2$<br>N,N-bis(dioxyethylene)octadecylamine | Nonionic |
| d | $C_{18}H_{37}-N((CH_2CH_2O)_nH)((CH_2CH_2O)_mH)$<br>N,N-bis(polyoxyethylene)octadecylamine<br>m + n = 30 | Nonionic |
| e | $C_{12}H_{25}-N(H)(CH_2CH_2OH)$<br>N-2-hydroxyethyldodecylamine | Nonionic |
| f | $CH_2=C(CH_3)-CO(CH_2CH_2O)_2H$<br>Diethylene glycol monomethacrylate | Nonionic |
| g | $CH_2=C(CH_3)-CO(CH_2CH_2O)_8H$<br>Polyethylene glycol monomethacrylate | Nonionic |
| h | Sorbitan trioleate | Nonionic |
| i | $C_{17}H_{35}-CO(CH_2CH_2O)_2H$<br>Dioxyethylene monostearate | Nonionic |
| j | Rape seed oil fatty acid polyoxyethylene ester | Nonionic |
| k | $C_{17}H_{35}-CO(CH_2CH_2O)_{25}H$<br>Polyoxyethylene monostearate | Nonionic |
| l | $R-C_6H_4-O-(CH_2CH_2O)_6H$<br>Polyoxyethylene alkylphenyl ether | Nonionic |
| m | $CH_3CH_2CH_2CH_2CH(CH_2CH_3)CH_2O-(CH_2CH_2O)_{11}H$<br>Polyoxyethylene 2-ethylhexyl ether | Nonionic |
| n | $C_8H_{17}O-(CH_2CH_2O)_{11}H$<br>Polyoxyethylene octyl ether | Nonionic |
| o | $C_{18}H_{37}O-(CH_2CH_2O)_{12}H$<br>Polyoxyethylene stearyl ether | Nonionic |
| p | $C_{12}H_{25}O-(CH_2CH_2O)_9H$<br>Polyoxyethylene lauryl ether | Nonionic |
| q | $HOCH_2-CH(OH)-CH_2OC(O)-C_{17}H_{35}$<br>Glycerol monostearate | Nonionic |
| r | Rape seed oil fatty acid glycerine monoester | Nonionic |

TABLE 10

| Component | Blending amount |
|---|---|
| SBR | 30 |
| NR | 70 |
| Aromatic oil | 15 |
| Stearic acid | 2 |
| Antioxidant | 1 |
| Wax | 1.5 |
| Zinc oxide | 3 |
| Vulcanization accelerator (DM) | 0.4 |
| Vulcanization accelerator (TBBS) | 0.6 |
| Sulfur | 1.8 |
| Silica | 50 |
| Coupling agent*1 | 5 |
| Surfactant | Variable |

*1: Si69 manufactured by Degussa AG.

TABLE 11

| | Comparative Example | | Example | | | | |
|---|---|---|---|---|---|---|---|
| | 9 | 10 | 23 | 24 | 25 | 26 | 27 |
| Surfactant | — | a | a | a | a | a | a |
| Blending amount | — | 0.3 | 0.6 | 1 | 3 | 5 | 7 |
| Volume resistivity | 1.3E15 | 1.0E15 | 3.4E14 | 9.7E13 | 3.7E13 | 1.0E13 | 2.8E12 |
| Wet skid | 100 | 100 | 101 | 100 | 101 | 101 | 99 |
| 50° C. tan $\delta$ | 100 | 100 | 100 | 99 | 99 | 98 | 97 |

| | Comparative Example | Example | | | | | |
|---|---|---|---|---|---|---|---|
| | 11 | 28 | 29 | 30 | 31 | 32 | 33 |
| Surfactant | a | b | c | d | e | f | g |
| Blending amount | 9 | 3 | 3 | 3 | 3 | 3 | 3 |
| Volume resistivity | 2.6E12 | 5.5E13 | 2.0E13 | 3.4E13 | 6.8E13 | 2.9E13 | 7.7E12 |
| Wet skid | 101 | 100 | 99 | 100 | 99 | 101 | 100 |
| 50° C. tan $\delta$ | 95 | 99 | 99 | 101 | 99 | 100 | 98 |

| | Example | | | | | | |
|---|---|---|---|---|---|---|---|
| | 34 | 35 | 36 | 37 | 38 | 39 | 40 |
| Surfactant | h | i | j | k | l | m | n |
| Blending amount | 3 | 3 | 3 | 3 | 3 | 3 | 3 |
| Volume resistivity | 1.3E14 | 7.5E13 | 4.7E13 | 2.3E13 | 8.9E12 | 8.0E12 | 7.8E12 |
| Wet skid | 101 | 99 | 101 | 100 | 99 | 100 | 99 |
| 50° C. tan $\delta$ | 99 | 98 | 98 | 100 | 101 | 101 | 100 |

| | Example | | | | Comparative Example | | |
|---|---|---|---|---|---|---|---|
| | 41 | 42 | 43 | 44 | 12 | 13 | 14* |
| Surfactant | o | p | q | r | L | K | — |
| Blending amount | 3 | 3 | 3 | 3 | 3 | 3 | — |
| Volume resistivity | 2.4E13 | 8.5E12 | 2.3E13 | 3.7E14 | 9.9E14 | 2.0E15 | 9.6E9 |
| Wet skid | 100 | 101 | 100 | 100 | 100 | 99 | 83 |
| 50° C. tan $\delta$ | 98 | 101 | 100 | 98 | 101 | 101 | 80 |

*Carbon black of 50 phr was blended in place of silica

Consideration on the Results Shown in Table 11

Shown in Table 11 are the cases where only the kinds of surfactants and the blending amounts thereof were varied while the rubbers component (NR and SBR) of 100 parts by weight, silica of 50 parts by weight as the filler (carbon black of 50 parts by weight only in Comparative Example 14) and the other compounding agents remained unchanged.

In Examples 23 to 44 in which the nonionic surfactants (a) to (r) of the present invention were blended, it has been found that the wet skid performances are highly compatible with the low exothermic properties, and since the volume resistivities are small, the generation of electrostatic charge is suppressed.

In Examples 23 to 27, it has been found that as the amount of the nonionic surfactant (a) increases, the volume resistivity decreases, and the 50° C. tan $\delta$ as index is lowered to some extent. Incidentally, the allowable range of the 50° C. tan $\delta$ is not lower than 96.

In contrast with this, Comparative Example 9 is the case in which the nonionic surfactant was not blended, wherein the volume resistivity is large, and therefore the generation of electrostatic charge can not be prevented. Comparative Example 10 is the case in which the blending amount of the nonionic surfactant was small (0.3 part by weight), wherein the volume resistivity is large as well, and therefore the generation of electrostatic charge can not be suppressed.

Comparative Example 11 is the case in which the blending amount of the nonionic surfactant was large (9 parts by weight), wherein it has been found that while the volume resistivity decreases, the 50° C. tan $\delta$ as index is low and the RR is deteriorated. Comparative Example 12 is the case where the anionic surfactant (L) was blended, and Comparative Example 13 is the case where the cationic surfactant (K) was blended. In these Comparative Examples 12 and 13, the volume resistivities are large, and therefore the generation of electrostatic charge has not been able to be suppressed. Comparative Example 14 is the case where the surfactant was not blended, and carbon black of 50 parts by weight was blended, wherein it has been found that while electrostatic charge is not produced because of the small volume resistivity, the wet skid performance and the RR are extremely deteriorated as compared with those of the case where silica was blended.

TABLE 12

|  | Comparative Example 15 | Example 45 | Example 46 | Example 47 | Example 48 | Comparative Example 16 |
|---|---|---|---|---|---|---|
| SBR | 60 | 60 | 60 | 60 | 60 | 60 |
| CL-IIR | 10 | 10 | 10 | 10 | 10 | 10 |
| NR | 30 | 30 | 30 | 30 | 30 | 30 |
| Aromatic oil | 20 | 20 | 20 | 20 | 20 | 20 |
| Stearic acid | 2 | 2 | 2 | 2 | 2 | 2 |
| Antioxidant | 1 | 1 | 1 | 1 | 1 | 1 |
| Wax | 1.5 | 1.5 | 1.5 | 1.5 | 1.5 | 1.5 |
| Zinc oxide | 3 | 3 | 3 | 3 | 3 | 3 |
| Vulcanization accelerator (DM) | 1 | 1 | 1 | 1 | 1 | 1 |
| Vulcanization accelerator (DPG) | 0.5 | 0.5 | 0.5 | 0.5 | 0.5 | 0.5 |
| Sulfur | 1.8 | 1.8 | 1.8 | 1.8 | 1.8 | 1.8 |
| Carbon black | 24 | 24 | 24 | 24 | 24 | 24 |
| Silica | 16 | 16 | 16 | 16 | 16 | 16 |
| Coupling agent*1 | 2 | 2 | 2 | 2 | 2 | 2 |
| Surfactant | — | c | g | l | m | L |
| Blending amount | — | 3 | 3 | 3 | 3 | 3 |
| Volume resistivity | 3.5E13 | 8.6E11 | 1.5E11 | 1.7E11 | 1.1E11 | 1.0E13 |
| Wet skid | 100 | 101 | 100 | 100 | 101 | 100 |
| 50° C. tan δ | 100 | 99 | 101 | 99 | 99 | 98 |

*1: Si69 manufactured by Degussa AG.

Consideration on the Results Shown in Table 12

Shown in Table 12 are the cases where silica was used in combination with carbon black as the fillers.

In Examples 45 to 48 in which the nonionic surfactants (c, g, l and m) falling in the range of the present invention were blended, it has been found that the wet skid performance are highly compatible with the RR's, and since the volume resistivities are small, the generation of electrostatic charge is suppressed.

In contrast with this, Comparative Example 15 is the case in which the nonionic surfactant was not blended, wherein the volume resistivity is large, and therefore the generation of electrostatic charge has not been able to be suppressed.

Comparative Example 16 is the case where the anionic surfactant (L) was blended, wherein the volume resistivity is large, and therefore the generation of electrostatic charge has not been able to be suppressed.

TABLE 13

|  | Comparative Example 17 | Example 49 | Example 50 | Example 51 |
|---|---|---|---|---|
| SBR | 100 | 100 | 100 | 100 |
| Aromatic oil | 37.5 | 37.5 | 37.5 | 37.5 |
| Stearic acid | 2 | 2 | 2 | 2 |
| Antioxidant | 1 | 1 | 1 | 1 |
| Wax | 1.5 | 1.5 | 1.5 | 1.5 |
| Zinc oxide | 3 | 3 | 3 | 3 |
| Vulcanization accelerator (DM) | 1.2 | 1.2 | 1.2 | 1.2 |
| Vulcanization accelerator (DPG) | 0.6 | 0.6 | 0.6 | 0.6 |
| Sulfur | 1.8 | 1.8 | 1.8 | 1.8 |
| Carbon black | 20 | 20 | 20 | 20 |
| Hygilite ™*1 | 80 | 80 | 80 | 80 |
| Surfactant | — | c | g | l |
| Blending amount | — | 3 | 3 | 3 |
| Volume resistivity | 4.7E12 | 1.3E11 | 2.4E10 | 2.2E10 |
| Wet skid | 100 | 100 | 99 | 99 |
| 50° C. tan δ | 100 | 101 | 102 | 99 |

*1: Aluminum hydroxide

Consideration on the Results Shown in Table 13

Shown in Table 13 are the cases where aluminum hydroxide (hygilite) was used in combination with carbon black as the fillers.

In Examples 49 to 51 in which the nonionic surfactants (c, g and l) falling in the range of the present invention were blended, it has been found that the wet skid performance are highly compatible with the RR's, and since the volume resistivities are small, the generation of electrostatic charge is suppressed.

In contrast with this, Comparative Example 17 is the case in which the nonionic surfactant was not blended, wherein the volume resistivity is large, and therefore the generation of electrostatic charge has not been able to be suppressed.

Examples 52 to 60 and Comparative Examples 18 to 19

Phosphoric esters shown in the following Table 14 were selected, and the fillers such as carbon black and silica were mixed first with the raw material rubbers (SBR and NR). Then, according to the recipes (blend unit: part by weight) shown in the following Tables 15 and 16, the other compounding agents and the compounds of the present invention were mixed by using the banbury type internal mixer to prepare the rubber compositions. Then, these rubber compositions were used to carry out the evaluation tests on the volume resistivity, wet skid performance and 50° C. tan δ (low exothermic property).

The evaluation results thereof are shown in the following Table 16.

TABLE 14

| No. | $R^5$ | $R^6$ | $R^7$ | q + r | s |
|---|---|---|---|---|---|
| (A) | $C_8H_{17}$— | | | | 4 |
| (B) | $C_8H_{17}$— | | | | 15 |
| (C) | $C_8H_{17}$— | | | | 30 |
| (D) | | $C_8H_{17}$— | $C_8H_{17}$— | | 15 |
| (E) | $C_{17}H_{35}$— | | | | 20 |
| (F) | $C_{20}H_{39}$— $C_{22}H_{43}$— mixture $C_{24}H_{48}$— | | | | 20 |
| (G) | $C_9H_{19}$—⟨phenyl⟩ | | | | 20 |

TABLE 15

| Component | Blending amount |
|---|---|
| SBR | 30 |
| NR | 70 |
| Aromatic oil | 15 |
| Stearic acid | 2 |
| Antioxidant | 1 |
| Wax | 1.5 |
| Zinc oxide | 3 |
| Vulcanization accelerator (DM) | 0.4 |
| Vulcanization accelerator (TBBS) | 0.6 |
| Sulfur | 1.8 |
| Silica | 50 |
| Coupling agent*1 | 5 |
| Surfactant | Variable |

*1: Si69 manufactured by Degussa AG.

In Examples 52 to 54, it has been found that as the amount of the phosphoric ester (A) increases, the volume resistivity decreases and the 50° C. tan δ as index is lowered to some extent. Incidentally, the allowable range of the 50° C. tan δ as index is not lower than 96.

In contrast with this, Comparative Example 18 is the case in which the phosphoric ester was not blended, wherein the volume resistivity is large, and therefore the generation of electrostatic charge can not be suppressed. Comparative Example 19 is the case in which the phosphoric ester was not blended, and carbon black of 50 parts by weight was blended, wherein it has been found that since the volume resistivity is small, electrostatic charge is not produced, but the wet skid performance and the RR are extremely deteriorated as compared with those of the cases where silica was blended.

Examples 61 to 62 and Comparative Example 20

The operation was carried out with a banbury mixer of about 400 liter at a rotary blade rate of 10 to 80 rpm by a conventional method to prepare the respective rubber compositions of 250 kg shown in Table 17. The components were blended at two stages: the first stage where all components except sulfur and the vulcanization accelerators were blended at a temperature of 130° to 180° C. for 2 to 6 minutes; the second stage where sulfur and the vulcanization accelerators were added to prepare the final compositions at a temperature of 100° C. or lower for 2 to 4 minutes. Finally, the compositions were molded into sheets, which were cured at 160° C. for 15 minutes.

TABLE 16

| | Comparative Example | Example | | | | | | | | | Comparative Example |
|---|---|---|---|---|---|---|---|---|---|---|---|
| | 18 | 52 | 53 | 54 | 55 | 56 | 57 | 58 | 59 | 60 | 19* |
| Phosphoric ester | — | (A) | (A) | (A) | (B) | (C) | (D) | (E) | (F) | (G) | — |
| Blending amount | — | 0.3 | 3 | 7 | 3 | 3 | 3 | 3 | 3 | 3 | — |
| Volume resistivity | 1.3E15 | 9.6E14 | 6.3E13 | 2.0E12 | 4.7E13 | 2.3E13 | 8.9E13 | 7.5E13 | 8.0E13 | 7.3E13 | 8.7E10 |
| Wet skid | 100 | 100 | 101 | 102 | 101 | 102 | 100 | 100 | 99 | 100 | 87 |
| 50° C. tan δ | 100 | 100 | 101 | 99 | 99 | 99 | 100 | 98 | 100 | 101 | 81 |

*Carbon black of 50 parts by weight was blended in place of silica.

Consideration on the Results Shown in Table 16

Shown in Table 16 are the cases where only the kinds of phosphoric esters and the blending amounts thereof were varied while the rubbers (NR and SBR) of 100 parts by weight, silica of 50 parts by weight as the filler (carbon black of 50 parts by weight only in Comparative Example 19), and the other compounding agents remained unchanged.

In Examples 52 to 60 in which the phosphoric esters (A) to (G) falling in the range of the present invention were blended, it has been found that the wet skid performance are highly compatible with the RR's, and since the volume resistivities are small, the conductivity is provided, and the generation of electrostatic charge is suppressed.

TABLE 17

| | Comparative Example | Example | |
|---|---|---|---|
| Components (phr) | 20 | 61 | 62 |
| $Sn_3$-SSBR*1 | 60 | 60 | 60 |
| IR*2 | 40 | 40 | 40 |
| Silica VN3 ™ | 50 | 50 | 50 |
| Stearic acid | 2 | 2 | 2 |
| Aromatic oil | 5 | 2.5 | — |

TABLE 17-continued

| Components (phr) | Comparative Example 20 | Example 61 | Example 62 |
|---|---|---|---|
| Coupling agent*3 | 5 | 5 | 5 |
| ZnO | 2 | 2 | 2 |
| Sulfur | 1.5 | 1.5 | 1.5 |
| Vulcanization accelerator (TBBS) | 1 | 1 | 1 |
| Vulcanization accelerator (DPG) | 1 | 1 | 1 |
| Antiozonant | 1 | 1 | 1 |
| TRITON-X ™ *4 | — | 2.5 | 5 |

*1: Tin coupled, solution-polymerized SBR: styrene 20%, cis 17%, trans 25%, and vinyl 58%; Tg: −33° C.
*2: Polyisoprene or a mixture of polyisoprenes with other material having a fine structure.
*3: Bis-(3-triethoxysilylpropyl)-tetrasulfide; Si69: manufactured by Degussa AG.
*4: manufactured by Union Carbide Corp.
Phr = parts by weight per 100 parts by weight of rubber polymer.

The cured rubber sheets described above were cut into rectangles of 12 cm×4.5 cm having a thickness of 2 mm, and an electrostatic field of each charged sample was determined with a Monroe 255 potentiometer in the following manner:

- the zero point of the potentiometer was adjusted according to a handling manual prepared by the manufacture, and the potentiometer was then put on a wood face;
- one face of each sample was rubbed hard with polyester cloth for 15 seconds to cause the generation of static electricity; and
- immediately after rubbing, the rubbed face of the sample was put opposite to the sensor of the potentiometer with a distance of 2.5 cm kept therebetween, and the electric field value was read out on the display.

Substances corresponding to the characteristics of the antistatic agent (TRITON-X™) according to the present invention are effective for removing electrostatic electricity and have provided the satisfactory results at a low concentration.

The cured sheets described above were tested according to the methods specified in ASTM D2240, D2632, D2048 and D412, and the results obtained in Examples 61 to 62 were compared with the result of the reference (Comparative Example 20) containing no antistatic agent. The results thereof are shown in Table 18.

Shown in Table 19 are the performance values (indices) of tires with treads made from the rubber compositions obtained in Example 62 and Comparative Example 20. As can be found from these results, the performance values are more excellent in both dry and wet road conditions in Example 62 as compared with those of Comparative Example 20 containing no antistatic agent.

TABLE 18

| Test | | Comparative Example 20 | Example 61 | Example 62 |
|---|---|---|---|---|
| Monsanto | ML (kgf-cm) | 2.1 | 2.6 | 2.9 |
| MDR2000E | MH (kgf-cm) | 16.2 | 15.6 | 14.9 |
| rheometer | T10 (minute/second) | 2.58 | 2.01 | 2.36 |
| 160° C. | T50 (minute/second) | 6.59 | 5.40 | 6.03 |
| | T90 (minute/second) | 15.37 | 16.18 | 15.25 |
| Tensile | T$_B$ (Mpa) | 16.5 | 19.4 | 17.6 |
| coefficient | 50% | 1.16 | 1.47 | 1.46 |

TABLE 18-continued

| Test | | Comparative Example 20 | Example 61 | Example 62 |
|---|---|---|---|---|
| and | 100% | 1.71 | 2.22 | 2.19 |
| elongation | 200% | 3.51 | 4.54 | 4.51 |
| | 300% | 5.75 | 7.47 | 7.52 |
| | E$_B$ (%) | 672 | 600 | 557 |
| Shore A hardness | | 65 | 71 | 73 |
| Flexometer °C. | | 140 | 120 | 120 |
| Impact resilience | Tan δ 30° C. | 0.22 | 0.20 | 0.26 |
| | Tan δ 60° C. | 0.16 | 0.16 | 0.14 |

TABLE 19

| Tire performances | Comarative Example 20 | Example 62 |
|---|---|---|
| Wet brake | 100 | 110 |
| Dry brake | 100 | 110 |
| Rolling resistance | 100 | 100 |

Industrial Applicability

The rubber composition of the present invention can reduce the volume resistivity itself and therefore provides the conductivity. In addition, the rubber composition is not exerted any influence on the basic physical properties and hold the antistatic property without having disadvantages by interaction among compounding agents for rubber. Accordingly, the conductivity can markedly be improved. The application of this rubber composition having an improved charging property to the treads of a pneumatic tire allows the wet skid performance to be highly compatible with the RR and prevents electrostatic electricity from being produced in rolling. Accordingly, there can be manufactured pneumatic tires having advantages that noises are not caused on radios in cars and electric shock is not brought to human bodies when touching cars.

We claim:

1. A rubber composition having an improved charging property, comprising 100 parts by weight of rubber component containing 90 parts by weight or more of diene rubber, and blended therewith 30 to 120 parts by weight of a filler, and 0.2 to 8 parts by weight of a nonionic surfactant or phosphoric ester represented by the following formula (V) or (VI):

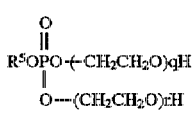

(V)

wherein $R^5$ represents a linear or branched, saturated or unsaturated aliphatic hydrocarbon group having carbon atoms of 8 to 25, or an aryl group, and q and r each is an integer satisfying a relation of q+r=1 to 30; or

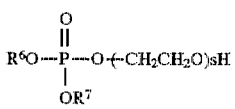 (VI)

wherein $R^6$ and $R^7$ each represent a linear or branched, saturated or unsaturated aliphatic hydrocarbon group having carbon atoms of 8 to 25, or an aryl group and may be the same or different, and s is an integer of 1 to 30.

2. A rubber composition as described in claim 1, wherein a white filler accounts for 40 weight % or more of the filler.

3. A rubber composition as described in claim 2, wherein the white filler is silica.

4. A rubber composition as described in claim 2, wherein the white filler is aluminum hydroxide.

5. A rubber composition having an improved charging property as described in any of claims 1 to 4, wherein the nonionic surfactant is an adduct of ethylene oxide of 2 to 30 moles to linear, cyclic or branched, and saturated or unsaturated, and monohydric or polyhydric aliphatic alcohol having carbon atoms of 6 to 25, or an adduct of ethylene oxide of 2 to 30 moles to alkylphenol.

6. A rubber composition as described in any of claims 1 to 4, wherein the nonionic surfactant is represented by the following formula (I):

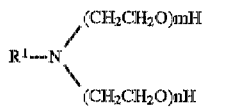 (I)

wherein $R^1$ represents a linear or branched, and saturated or unsaturated aliphatic hydrocarbon group having carbon atoms of 8 to 25, and m+n is an integer of 1 to 30 in terms of a central value.

7. A rubber composition as described in any of claims 1 to 4, wherein the nonionic surfactant is represented by the following formula (II):

 (II)

wherein $R^2$ represents a linear or branched, and saturated or unsaturated aliphatic hydrocarbon group having carbon atoms of 8 to 25, a vinyl group, an isopropenyl group, or an aryl group, and x is an integer of 2 to 30 in terms of a central value.

8. A rubber composition as described in any of claims 1 to 4, wherein the nonionic surfactant is represented by the following formula (IV):

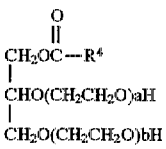 (IV)

wherein $R^4$ represents a linear or branched, and saturated or unsaturated aliphatic hydrocarbon group having carbon atoms of 8 to 25, and a+b is an integer of 0 to 30 in terms of a central value.

9. A rubber composition having an improved charging property comprising 100 parts by weight of rubber component comprising a copolymer of an aromatic vinyl hydrocarbon and a diene monomer, wherein the amount to the aromatic vinyl hydrocarbon is about 30 to 70 parts by weight; the diene vinyl content is less than 20%; Mn value is 250,000 or more; and polydispersity index Mw/Mn is less than 2.5, a white filler, a coupling agent, which comprises silane, of 1 to 15 weight % based on the weight of the white filler, and a nonionic surfactant represented by the following formula (VII):

 (VII)

wherein $R^8$ represents a hydrophilic group, and $R^9$ represents a substituted or non-substituted aryl group.

10. A rubber composition having an improved charging property, comprsing:

(a) 50 to 100 parts by weight of a solution polymerized diene polymer or copolymer having a carbon-metal bond in the main chain, (b) 0 to 50 parts by weight of an elastic polymer selected from the group consisting of 1,4-polyisoprene (1,4-IR), 3,4-polyisoprene (3,4-IR), polybutadiene (BR), natural rubber (NR), epoxidized natural rubber (ENR), styrene-butadiene rubber (SBR), and the mixtures thereof, (c) a filler comprising a white filler or the mixture of carbon black and the white filler, (d) a coupling agent, which comprises silane, of 0.5 to 10 weight % based on the weight of the white filler, and (e) a nonionic surfactant represented by the following formula (VII):

 (VII)

wherein $R^8$ represents a hydrophilic group, and $R^9$ represents a substituted or non-substituted aryl group.

11. A rubber composition as described in claim 9, wherein $R^8$ is the formula —(O—CH$_2$—CH$_2$)$_t$—OH (t is an integer of 5 to 10).

12. A rubber composition as described in claim 9 or 11, wherein $R^9$ is an alkylaryl group.

13. A rubber composition as described in claim 12, wherein $R^9$ is the formula:

and, $R^{10}$ is an aliphatic group.

14. A rubber composition as described in claim 13, wherein $R^{10}$ is the formula:

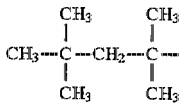

15. A rubber composition as described in claim 10, wherein $R^8$ is the formula —(O—CH$_2$—CH$_2$)$_t$ OH (t is an integer of 5 to 10).

16. A rubber composition as described in claim 10 or 15, wherein $R^9$ is an alkylaryl group.

17. A rubber composition as described claim 16, wherein $R^9$ is the formula:

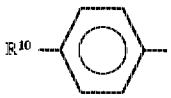

and, $R^{10}$ is an aliphatic group.

18. A rubber composition as described in claim 17, wherein $R^{10}$ is the formula:

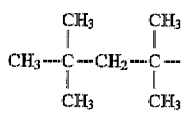

19. A rubber composition as described in any of claims 9 to 18, wherein the silica filler is precipitated silica having a BET surface area of 20 to 300 m²/g.

20. A rubber composition as described in claim 19, wherein the total amount of the filler falls in a range of 60 to 100 parts by weight per 100 parts by weight of the rubber polymer.

21. A rubber composition as described in claim 20, wherein the silica filler accounts for 40 to 90 weight % of the whole filler.

22. A neumatic tire manufactured by using the rubber composition as described in any of claims 1 to 21 for the tread parts of the pneumatic tire.

* * * * *